(12) United States Patent
Kostigian

(10) Patent No.: US 8,099,815 B2
(45) Date of Patent: Jan. 24, 2012

(54) GYMNASIUM FLOOR COVERING STORAGE AND CLEANING RACK

(75) Inventor: John V. Kostigian, Cambridge (CA)

(73) Assignee: Galt Display Rack Co Ltd

( * ) Notice: Subject to any disclaimer, the term of this patent is extended or adjusted under 35 U.S.C. 154(b) by 675 days.

(21) Appl. No.: 12/285,136

(22) Filed: Sep. 29, 2008

(65) Prior Publication Data

US 2009/0065457 A1    Mar. 12, 2009

Related U.S. Application Data

(63) Continuation-in-part of application No. 11/010,287, filed on Dec. 14, 2004, now abandoned.

(51) Int. Cl.
*A47F 7/17*    (2006.01)
(52) U.S. Cl. ............ 15/40; 15/88.1; 15/268; 242/388.6; 242/388.7; 242/404.3; 211/44; 492/47
(58) Field of Classification Search ................ 15/40, 48, 15/39.5, 88.1, 268; 242/388.5–388.7, 557, 242/376.1, 404.3, 407, 598.3, 598.4; 492/16, 492/47; 211/44
See application file for complete search history.

(56) References Cited

U.S. PATENT DOCUMENTS

| | | | |
|---|---|---|---|
| 1,073,519 A | 9/1913 | Raabe | |
| 1,229,086 A | 6/1917 | Johnson | |
| 2,551,190 A | 5/1951 | Walker | |
| 2,601,560 A | 6/1952 | Riemenschneider | |
| 2,692,687 A | 10/1954 | Best | |
| 3,413,826 A | 12/1968 | Abowitz | |
| 4,360,172 A | 11/1982 | Cope | |
| 4,783,017 A | 11/1988 | Ovitz | |
| 4,824,049 A | 4/1989 | Kelly | |
| 5,590,435 A * | 1/1997 | Kostigian | 15/40 |
| 5,806,124 A * | 9/1998 | Schneider et al. | 15/88.3 |
| 6,471,174 B2 | 10/2002 | Turner | |
| 7,496,983 B2 * | 3/2009 | Kostigian | 15/40 |
| 2005/0218258 A1 | 10/2005 | Valerio | |
| 2006/0096047 A1 * | 5/2006 | Kostigian | 15/40 |

FOREIGN PATENT DOCUMENTS

| | | |
|---|---|---|
| CA | 1090312 | 11/1980 |
| CA | 1304734 | 7/1992 |
| CA | 2145438 | 3/1999 |

* cited by examiner

*Primary Examiner* — Mark Spisich
*Assistant Examiner* — Michael Jennings

(57) ABSTRACT

The present invention relates to a floor covering storage and dispensing rack including a frame equipped with extendable members having castors. Floor lock anchors are also provided on the frame. Upper frame members of the rack support rollers in spaced relation and a crank or motor is provided to rotate the rollers to wind floor covering onto the rollers for storage. Perforated end caps are provided on the rollers to limit access to moving parts. An elongated cleaning head consisting of a pair of brushes is provided on a frame member. Floor covering passes over at least one brush when the floor covering is retrieved or dispensed to remove dirt prior to storage or reuse.

2 Claims, 6 Drawing Sheets

GYMNASIUM FLOOR COVERING STORAGE AND CLEANING RACK

This application is a Continuation In Part of U.S. Ser. No. 11/010,287 filed Dec. 14, 2004, now abandoned. This application Corresponds to Canadian 2,484,454 filed Nov. 1, 2004

BACKGROUND OF THE INVENTION

This invention relates to floor covering storage and dispensing racks and more particularly to a rack having brushes for removing dirt as the floor covering is returned to storage.

The use of gymnasium floors for other activities and social gatherings has always caused concern that the quality of the floor will deteriorate due to street shoes being worn during activities other than sports. It has therefore become the practice to cover gymnasium floors with sheets of thin flooring material composed of suitable synthetic material such as vinyl. The plastic covering is stored on rolls when not in use.

DESCRIPTION OF THE BACKGROUND ART

Floor covering racks are well known for display and dispensing purposes. The floor covering is stored on rotatable rolls on a rack and can be conveniently withdrawn and laid on the floor. The floor covering is conveniently retrieved by rotating the roller by means of a crank or an electric motor. It has now been found that it is also desirable to sweep the floor covering before returning it to the storage roll. Floor covering storing and dispensing racks available for retrieving floor covering from gymnasiums include those disclosed in Canadian Patent Nos. 1,304,734, 1,090,312, 2,145,438 and U.S. Pat. No. 5,590,435 incorporated herein by reference.

These prior devices did not entirely meet the requirements for a lightweight frame capable of storing ten rolls of floor covering one above the other on two sides of the frame. A broad base to avoid tipping is also desirable. Furthermore, floor anchors capable of being locked in position during retrieval of the floor covering had not been contemplated for known storage and display racks.

SUMMARY OF THE INVENTION

The present invention seeks to overcome the deficiencies of the prior devices by providing a floor covering apparatus having an extendable broad base to accommodate multiple rolls of floor covering, while providing stability during retrieval.

The present invention further seeks to provide a floor covering dispensing and retrieval apparatus having antifriction castors and a floor lock adapted to be locked into place during retrieval of floor covering.

The present invention seeks to provide a floor covering retrieval and dispensing apparatus having one or more cleaning heads or brushes to remove dirt from the floor covering as it is retrieved and stored.

Accordingly, the present invention provides a floor covering storage and dispensing rack comprising: a frame, lower frame members including ground engaging means and an extendable broad base, rollers for receiving floor covering supported on the sides of the frame in parallel spaced relation, means for winding the floor covering on the rollers, an elongate cleaning head extending along a frame member parallel to the rolls, whereby material received on said rollers contacts the cleaning head as it is returned to storage on the rollers of the floor covering storage rack.

BRIEF DESCRIPTION OF THE DRAWINGS

In the drawings, which illustrate embodiments of the invention.

DETAILED DESCRIPTION OF THE PREFERRED EMBODIMENT

Figure 1:
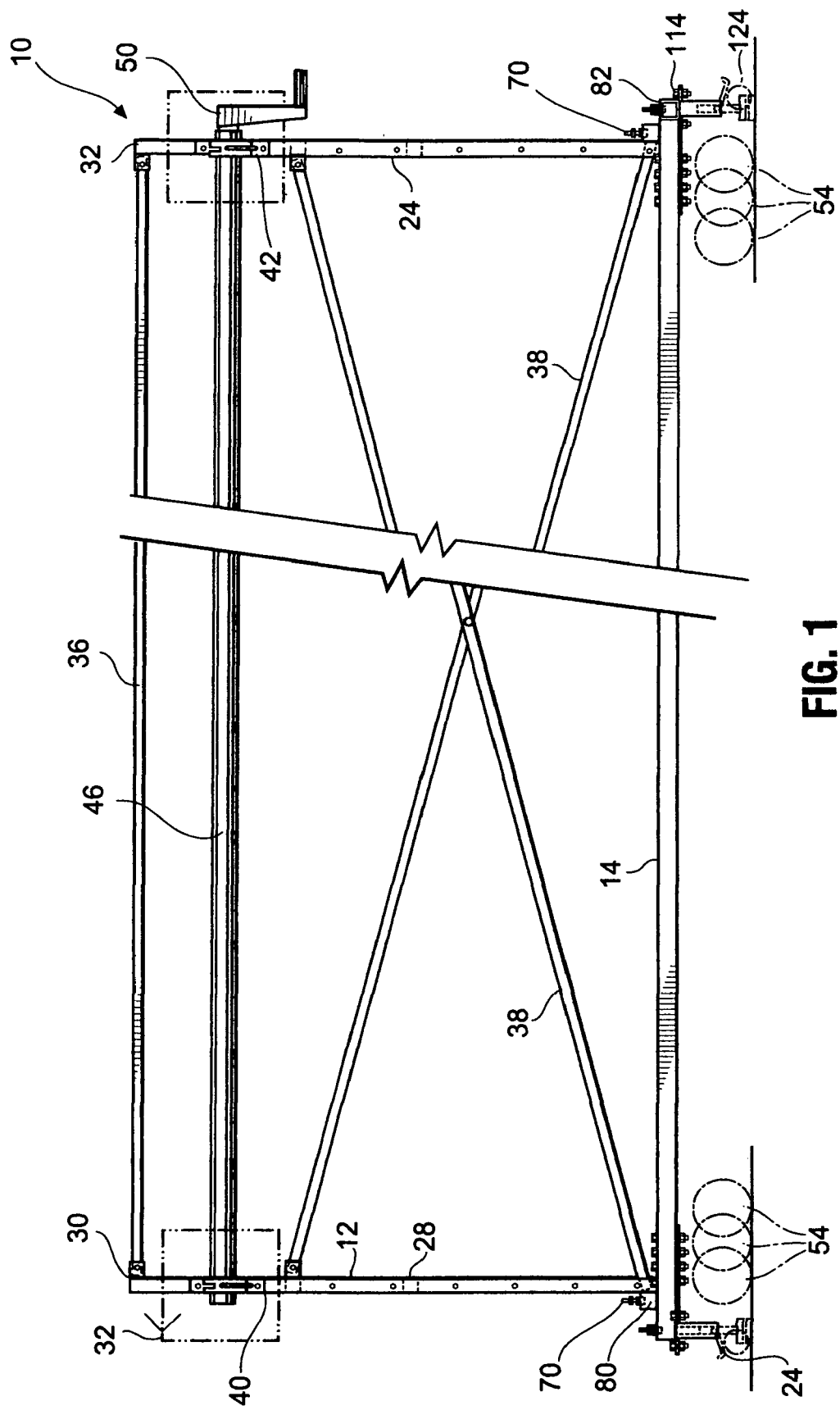
FIG. 1 is a front elevational view of a floor covering storage and dispensing rack in accordance with this invention.

In the drawings, which illustrate an embodiment of the invention, the floor covering storage dispensing and retrieval rack is shown generally at 10 in FIG. 1, comprises a frame 12. The frame 12 is constructed of angle iron members to reduce weight although tubular members of circular or square cross section could also be used. The frame 12 includes a rectangular base having front and rear members 14 and 16 and interconnecting side members 18 and 20. A first upright side member includes uprights 22 and 24 is secured to a side member 18 in a conventional manner such as by bolts, rivets or welding and a second upright side member includes uprights 26 and 28 is secured to the opposing side member 18. Upper ends of the uprights 22 and 24 are joined by a top wall member 30 and the uprights 26 and 28 are joined by an integral top wall member 32. The top wall members 30 and 32 of the first and second side members are interconnected by at least one top rail 36. Diagonal braces 38 are provided on the frame.

Figure 4:
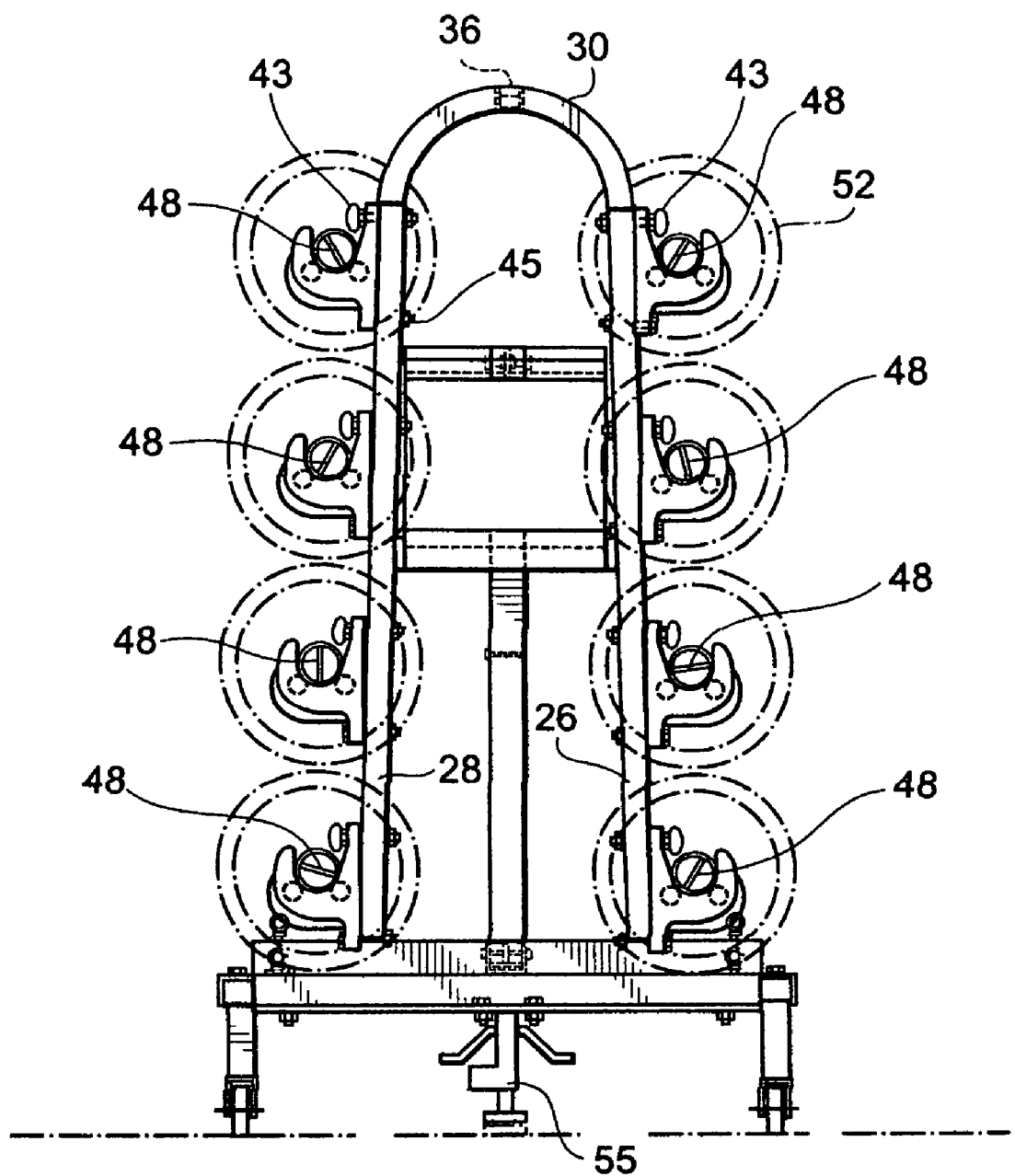
FIG. 4 is an end elevational view showing the floor covering material stored on the rack and the floor covering cleaning brush attached to the rack.
Figure 5:
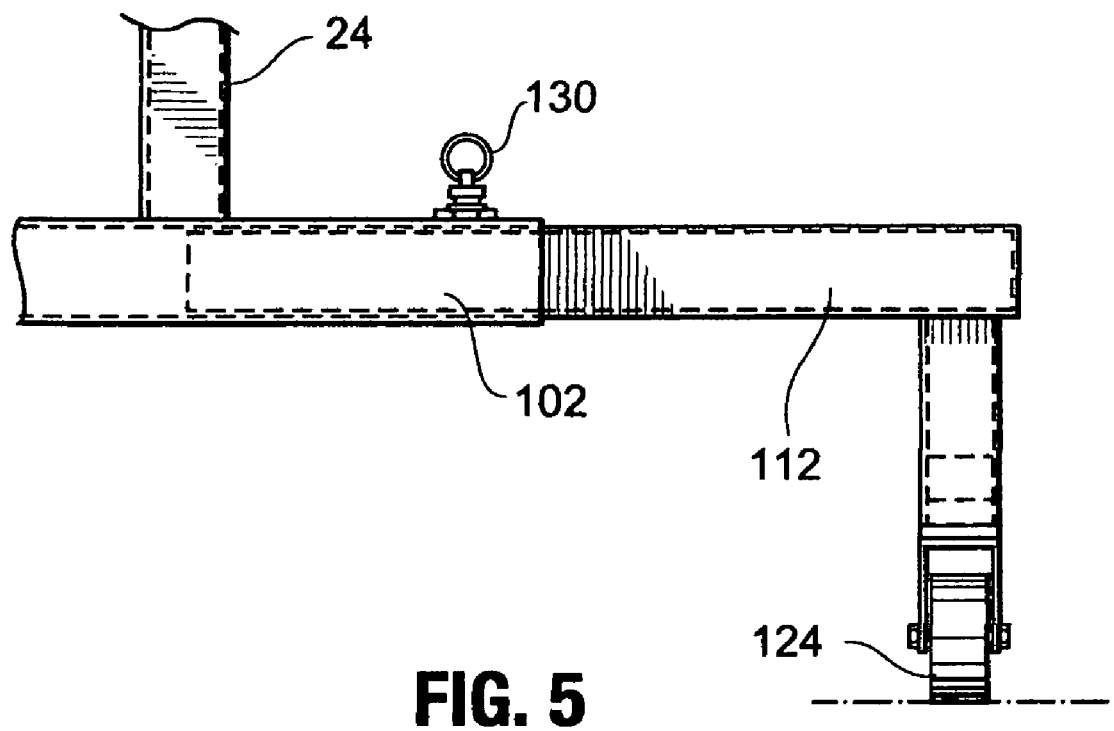
FIG. 5 is an enlarged view of the extendable base.
Figure 6:
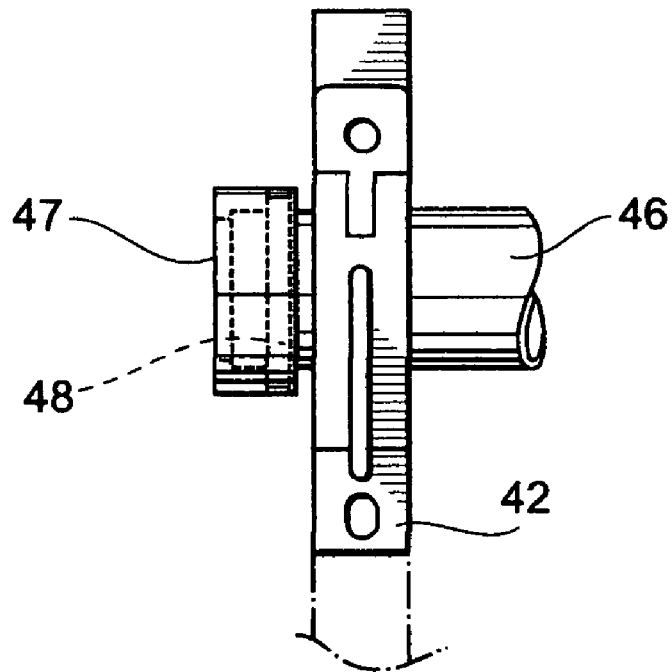
FIG. 6 is an enlarged view of a safety end cap for the rollers
Figure 7:
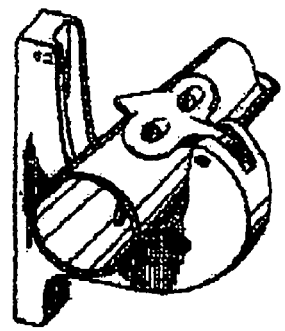
FIGS. 7 and 8 are Prior Art racks showing rollers provided with pins.
Figure 8:
Figure 9:
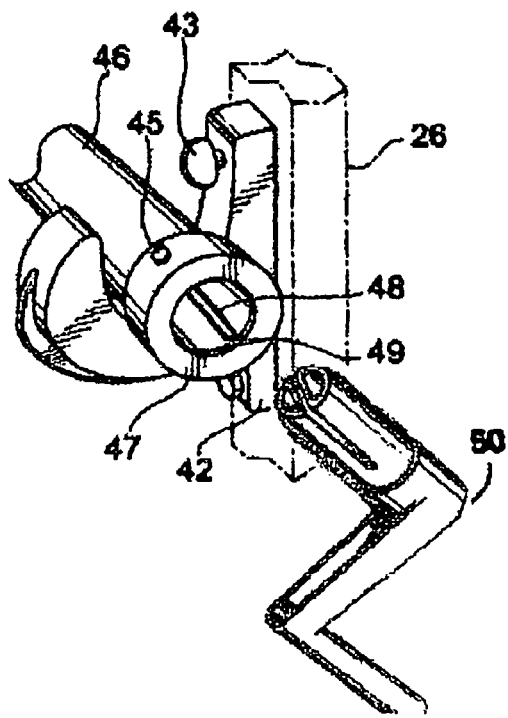
FIG. 9 is a perspective view of the safety cap and retaining pin.

Pairs of brackets 40 and 42 are secured to the uprights 24 and 28 to support rollers 46. The ends of the rollers 46 are adapted to receive manual cranking means 50 or electrically driven cranking means, not shown. The uprights 22 and 26 are also provided with pairs of brackets 40 and 42 fastened by bolts 43 and 45 for holding rollers 46. It is therefore possible to retrieve and store up to ten rolls of floor covering, shown in broken lines at 52 in FIG. 4. The rollers 46 are provided with apertured end caps or collars 47 to limit access to moving parts such as pins 48 in the rollers 46 which pass through apertures 45' in the collars 47.

The frame 12 is supported by six rubber tired castors 54 secured to the frame 12 in a conventional manner so that the rack 10 and floor covering 52 can be conveniently rolled from storage.

Floor lock brakes 55 are installed on the frame 12 so that during the dispensing and retrieving operation, the rack 10 will remain stationary.

Figure 2:
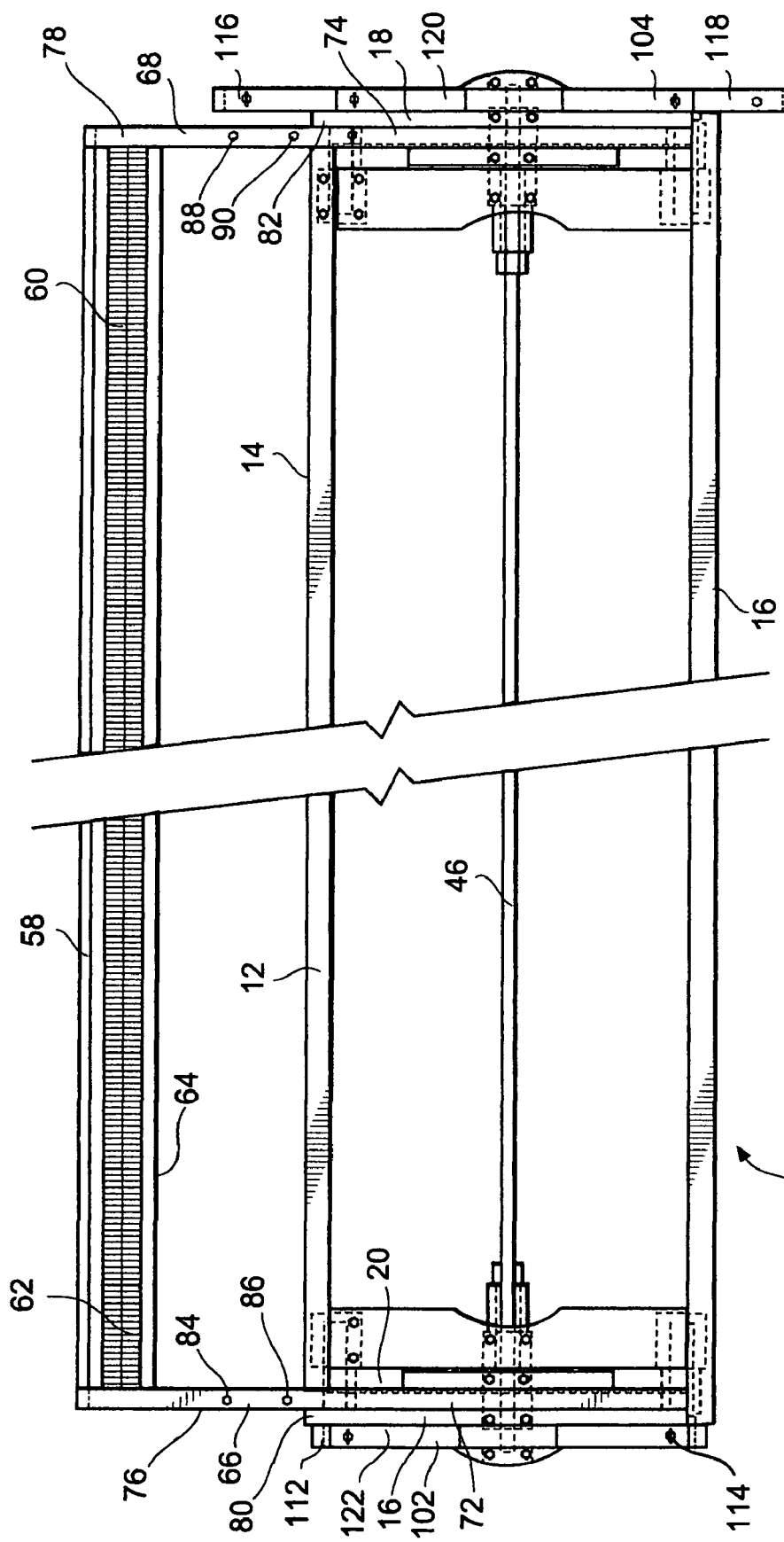
FIG. 2 is a top plan view of the floor covering storage rack.
Figure 3:
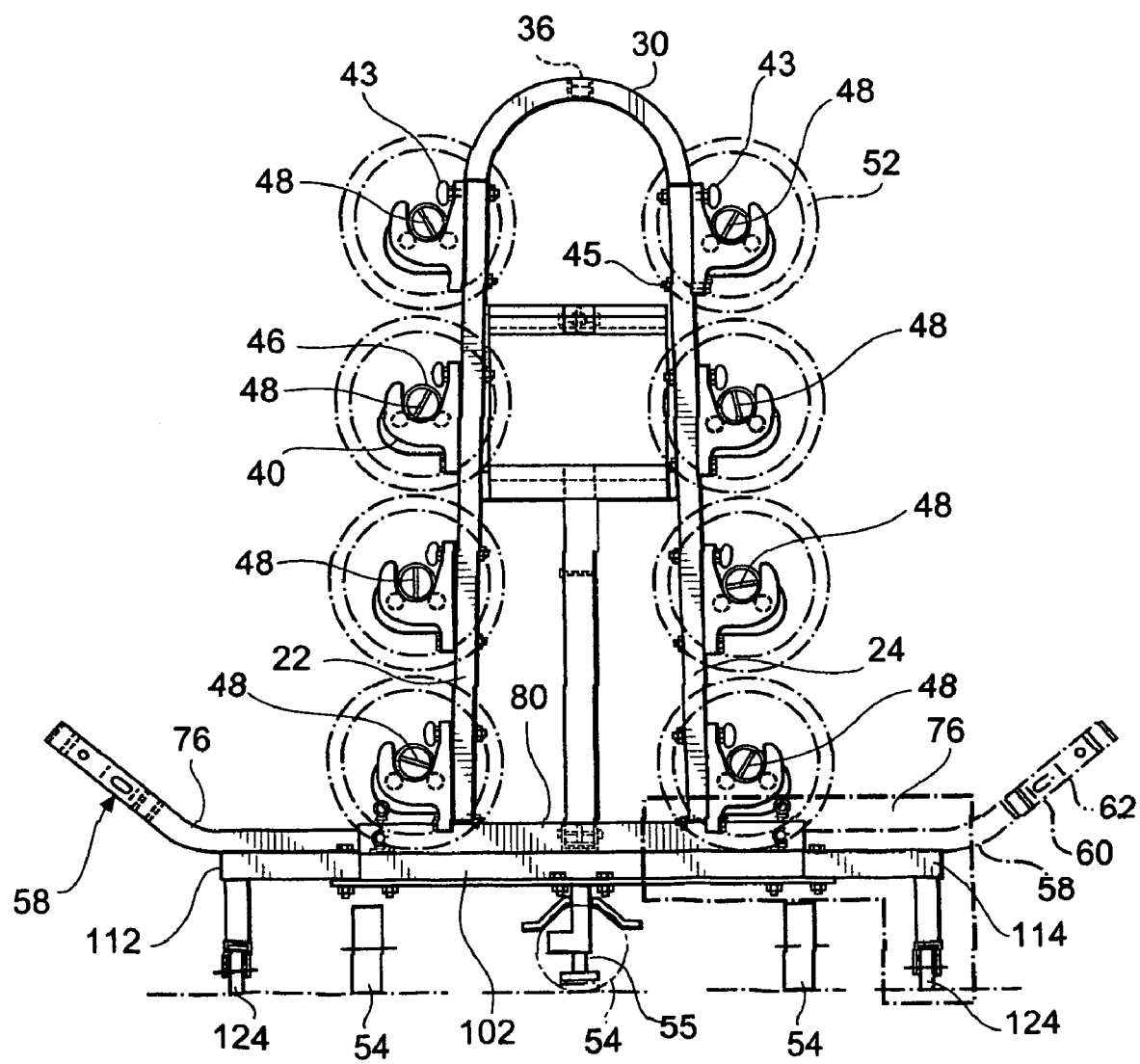
FIG. 3 is an end elevational view showing the floor covering rack retrieving covering material and the cleaning head attached to the rack.

As shown more clearly in FIGS. 2 and 3, a cleaning head 58 comprising a pair of opposed brushes 60 and 62 extend along the frame member 14. The ends of bristles 64 of the brushes 60 and 62 extend towards each other and preferably abut or intermesh.

The brushes 60 and 62 have mounting brackets 66 and 68 respectively, at their ends. The brackets 66 and 68 are square tubular members provided with set screws 70. The brackets 66 and 68 also have a tubular portion 72 and 74 respectively, disposed at a right angle to the brush 60 or 62 to receive rails 76 and 78.

The rails 76 and 78 are slideably received in square tubes 80 and 82 releasably secured to side rails 16 and 18 by bolts 84, 86, 88 and 90 provided with conventional fasteners.

In order to reduce the risk of tipping the base of the rack 10 is preferably provided with an outrigger of extendable members to expand the frame 12 during loading and unloading of the floor covering.

Although other means such as hinged or bolted members might be considered, the preferred method includes tubular retaining members 102 and 104 secured to the frame members 18 and 20 at the sides of the frame 12. The retaining member 102 receives two extendable members 112 and 114 to move outwardly beyond the frame 12 at the front and rear of the rack 10. Similarly, two extendable members 116 and 118 are provided in the retaining member 104. Castors 124 are preferably provided on the ends outer ends of the extendable members 112, 114, 116 and 118 and set screw fasteners 130 are used to retain each of the extendable members in selected positions.

In use, the rack 10 having been provided with up to 10 rolls of vinyl floor covering is moved from storage to a dispensing position. The floor covering is then unrolled from successive rollers by pulling on the floor covering while the floor locks are locked. The rack is unlocked to move the rack to another dispensing position. It is optional whether or not to pass the floor covering through the brushes 60 and 62 during the dispensing operation.

When the floor covering is to be retrieved, the rack 10 is positioned at one end of a strip of floor covering, so that the floor covering can be inserted through the brushes 60 and 62. Spring clips, not shown, secure the floor covering to the roller 46 as described in Canadian Patent No. 1,090,312 and the roller is rotated by means of the crank 50 or by means of an electric power drill adapted for this purpose.

The loose dirt on the upper surface of the floor covering will be swept to the end by the brush 62 and dirt on the underside will fall beneath the rack 10 and can be readily collected for disposal. The brushes 60, 62 and the cleaning head 58 are capable of being detached and secured along the rail 16 to clean floor covering retrieved and stored on the rollers 46 on the uprights 22 and 26. The cleaning head may also be detached and moved to other storage racks 10.

After the floor covering is retrieved and cleaned, in this manner, the floor anchors 55 are unlocked to permit moving the rack 10 to a storage area.

In use, the rack 10 having been provided with up to 10 rolls of vinyl floor covering is moved from storage to a dispensing position. The floor covering is then unrolled from successive rollers by pulling on the floor covering while the floor anchors are locked. The floor anchors are unlocked to move the rack 10 to another dispensing position. It is optional whether or not to pass the floor covering through the brushes 60 and 62 during the dispensing operation. The floor covering retrieved and cleaned in this manner is then moved to a storage area after the floor anchors have been unlocked.

I claim:

1. In a rack for use in retrieving, cleaning and storing floor covering for temporarily covering a floor to be protected, said rack including: a frame having a rectangular base including two side members, and front and rear frame members; and extendable members provided with floor engaging casters secured to each of the side members to move outwardly of the front and rear frame member, a lower frame member respectively at a front frame member, a respective first and second upright sides secured to each side member of the base, the first and second upright sides being joined at their upper ends; a plurality of rollers rotatably mounted between the first and second upright sides in a vertically spaced, parallel relationship above the front and rear edges of the frame; brackets for mounting the rollers, pins extending through the rollers on both sides of the brackets wherein an apertured end cap is provided on each end of the roller and retained by an adjacent one of the pins extending through holes in sides of the apertured cap, means for rotating a selected roller of the plurality of rollers for extending through said apertured cap and engaging the pin whereby as said floor covering is returned to storage upon said selected roller by operating the means for rotating the roller in order to retrieve the floor covering from the floor for storage.

2. A rack for use in retrieving, cleaning and storing floor covering for temporarily covering a floor to be protected, said rack comprising: a frame having a rectangular base including two side edges, a front edge, and a rear edge; and a respective first and second upright sides secured at each side edge of the base, the first and second upright sides being joined at their upper ends; and a plurality of rollers for storing the floor covering are rotatably mounted between the first and second upright sides in a vertically spaced; parallel relationship above the front and rear edges of the frame; means for rotating a selected roller of the plurality of rollers; ground engaging means on the base and on each extendable member and locking floor engaging means on the base; and an elongated cleaning head extending upwardly at an angle to the frame, said cleaning head comprising a cleaning material on a pair of mutually opposed cleaning material supports, and means for removably securing the cleaning material supports to the frame: whereby a floor covering is passed through said cleaning head when said floor covering is returned to storage upon said selected roller by operating the means for rotating in order to clean the floor covering as it is being retrieved from the floor for storage wherein ends of the rollers are provided with apertured end caps retained by pins extending across the rollers and passing through apertures in the end caps, the pins being engaged by means for rotating a selected roller while limiting access to ends of the pins and moving parts on the ends of the rollers for safety reasons.

* * * * *